(12) United States Patent
Gottwald et al.

(10) Patent No.: US 9,004,602 B2
(45) Date of Patent: Apr. 14, 2015

(54) LATCHING DEVICE FOR A HEAD RESTRAINT

(75) Inventors: Martin Gottwald, Leverkusen (DE); Jan Stransky, Banovce n. B (SK); Mikulas Ptasinsky, Giraltovce (SK); Michael Martinka, Nove Mesto n. V (SK); Daniel Schmitt, Reitweiler (FR); Ralph Michalka, Dusseldorf (DE)

(73) Assignee: Johnson Controls Technology Company, Holland, MI (US)

( * ) Notice: Subject to any disclaimer, the term of this patent is extended or adjusted under 35 U.S.C. 154(b) by 15 days.

(21) Appl. No.: 13/817,617

(22) PCT Filed: Aug. 25, 2011

(86) PCT No.: PCT/EP2011/064622
§ 371 (c)(1),
(2), (4) Date: Apr. 29, 2013

(87) PCT Pub. No.: WO2012/025586
PCT Pub. Date: Mar. 1, 2012

(65) Prior Publication Data
US 2013/0207437 A1    Aug. 15, 2013

(30) Foreign Application Priority Data

Aug. 26, 2010   (DE) .......................... 10 2010 035 429

(51) Int. Cl.
*B60R 22/28*   (2006.01)
*B60N 2/48*    (2006.01)

(52) U.S. Cl.
CPC ............ *B60N 2/4805* (2013.01); *B60N 2/4814* (2013.01); *B60N 2/4817* (2013.01)

(58) Field of Classification Search
USPC ......................................... 297/410, 409, 391
See application file for complete search history.

(56) References Cited

U.S. PATENT DOCUMENTS 4,671,573 A * 6/1987 Nemoto et al. ............... 297/410
7,316,455 B2 * 1/2008 Metz et al. .................... 297/410
(Continued)

FOREIGN PATENT DOCUMENTS

| CN | 100500474 C  | 6/2009 |
| CN | 201268246 Y  | 7/2009 |

(Continued)

OTHER PUBLICATIONS

International Search Report for application No. PCT/EP2011/064622 mailed Aug. 25, 2011.

(Continued)

*Primary Examiner* — David E Allred
(74) *Attorney, Agent, or Firm* — Fletcher Yoder, P.C.

(57) ABSTRACT

In a latching device for a head restraint, a locking element is movably mounted in a carrier device. The locking element can be moved from a locked position into an unlocked position by actuation of an actuating device. The latching device is movably mounted with respect to a retaining rod. In the unlocked position, the locking element allows the latching device to be moved with respect to the retaining rod, while in the locked position the locking element engages in at least one cut-out of the retaining rod for latching the latching device with respect to the retaining rod. According to the invention, in the locked position the carrier device, together with the locking element arranged therein, is mirror-symmetrical to an xz plane extending substantially perpendicularly to the carrier device.

9 Claims, 7 Drawing Sheets

(56) References Cited

U.S. PATENT DOCUMENTS

| | | | |
|---|---|---|---|
| 7,562,936 B1* | 7/2009 | Veine et al. .................. 297/410 |
| 7,621,598 B2* | 11/2009 | Humer et al. ................. 297/410 |
| 8,376,465 B2* | 2/2013 | Veine et al. .................. 297/410 |
| 8,573,703 B2* | 11/2013 | Poehlmann et al. .......... 297/410 |
| 2006/0186720 A1 | 8/2006 | Linardi et al. |
| 2006/0214491 A1 | 9/2006 | Metz et al. |
| 2011/0006578 A1* | 1/2011 | Veine et al. .................. 297/410 |

FOREIGN PATENT DOCUMENTS

| | | |
|---|---|---|
| DE | 29613073 U1 | 9/1996 |
| DE | 10312517 A1 | 10/2004 |
| DE | 102005017580 B3 | 9/2006 |
| DE | 102005033343 A1 | 1/2007 |
| EP | 0864461 A1 | 9/1998 |
| JP | S62188256 U | 11/1987 |
| JP | H02009152 U | 1/1990 |
| JP | H030294046 U | 3/1991 |
| JP | 2006520226 A | 9/2006 |

OTHER PUBLICATIONS

Japanese Office Action dated Mar. 14, 2014.
Chinese Office Action of CN 201180041372.3 mailed Oct. 10, 2014.

\* cited by examiner

LATCHING DEVICE FOR A HEAD RESTRAINT

CROSS REFERENCE TO RELATED APPLICATIONS

This application claims priority from and the benefit of PCT Application No. PCT/EP2011/064622, filed on Aug. 25, 2011; and German Patent DE 10 2010 035 429.5, filed on Aug. 26, 2010; both entitled "Latching Device for a Head Restraint", which are herein incorporated by reference.

BACKGROUND

The invention relates to a latching device for a head restraint and a head restraint for a vehicle seat.

Vehicle seats with height-adjustable head restraints are known from the prior art, said head restraints being used, in particular, in a front region of a vehicle. In this case, the height-adjustable head restraint serves for the comfort of a vehicle occupant and for avoiding injuries in the event of accidents.

A head restraint for a vehicle seat is disclosed in DE 10 2005 017 580 B3, said head restraint comprising a head restraint body which is height-adjustable relative to a head restraint rod. For locking the head restraint body to the head restraint rod, a pivotably mounted and pretensioned locking element is provided, said locking element being able to be activated by an actuating element. To this end, the locking element engages in a notch of the head restraint rod.

DE 10 2005 033 343 B4 describes the aforementioned head restraint, wherein the head restraint rods are configured such that they permit a compensation of tolerances and/or errors.

A latching device with spring means and a head restraint with such a latching device is disclosed in DE 103 12 517 A1. The latching device is able to be adjusted relative to two retaining rods, wherein for the latching process the spring means cooperate with a plurality of recesses of the retaining rods. The latching of the retaining rods is able to be effected by a mechanical fixing of the spring means in a central region. Alternatively, the action of force on the spring means in the central region effects a latching of the two retaining rods.

SUMMARY

The present invention relates to a . . . .

It is the object of the present invention to specify an improved latching device and an improved head restraint, wherein cost-efficient mass production is possible.

The object is achieved according to the invention by a latching device for a head restraint having the features of claim 1 and a head restraint for a vehicle seat having the features of claim 10.

Preferred embodiments of the invention form the subject-matter of the sub-claims.

In a latching device for a head restraint, a locking element is displaceably mounted in a carrier device. The locking element is able to be displaced from a locked position into an unlocked position by means of an actuation of an actuating device. The latching device is displaceably mounted relative to a retaining rod. When reference is made hereinafter to a retaining rod, it is clear to the person skilled in the art that there may be a plurality of retaining rods, in particular two retaining rods. In the unlocked position, the locking element permits a displacement of the latching device relative to the retaining rod, whereas in the locked position the locking element engages in at least one recess of the retaining rod for latching the latching device relative to the retaining rod. According to the invention, in the locked position the carrier device with the locking element arranged therein is configured mirror-symmetrically to an xz-plane extending substantially perpendicularly to the carrier device.

In a particularly advantageous manner, a modular design is produced with the mirror-symmetrical configuration of the carrier device and the locking element of the latching device. Irrespective of the planned spatial arrangement of the head restraint, in particular in a vehicle, and the spatial arrangement of the actuating device fastened to the head restraint, due to the mirror symmetry a similar latching device may be used for latching each of the head restraints which are, in particular, height-adjustable.

This is advantageous, in particular, for use of the latching device and the head restraint in a vehicle, such as for example for a vehicle seat in the front region of a passenger motor vehicle as, for spatial reasons, the actuating device is often only able to be attached to one side of the head restraint. In this case, the actuating device of the head restraint of a driver's seat is attached to one side, whereas the actuating device of the head restraint of a passenger seat is attached to the opposing side. The mirror symmetry of the carrier device and the locking element of the latching device permits the fastening of the actuating device, in particular, either on the left-hand side or right-hand side of the xz-plane along a y-axis extending perpendicularly to the xz-plane.

Preferably, the locking element engages positively and/or non-positively in the recess of the retaining rod.

The use of similar latching devices for differently arranged head restraints, in particular in a vehicle interior, permits the mass production of the latching devices, whereby production costs are saved. In particular, it is unnecessary to produce different latching devices which are configured in a substantially mirror-inverted manner relative to one another, in order to permit an arrangement of the actuating device on the left-hand side or right-hand side.

According to a preferred embodiment of the invention, a first spring means pretensions the locking element into the locked position. Thus it is ensured that the latching device is mechanically fixed to the retaining rod, as long as the actuating device is not actuated.

Preferably, the carrier device comprises an upper carrier plate and a lower carrier plate, wherein the upper carrier plate and the lower carrier plate are displaceable relative to one another and parallel to the y-axis. If the latching device is built into a head restraint of a vehicle seat, in particular, the y-axis may be oriented transversely to a direction of travel which extends parallel to an x-axis. By means of the lower and upper carrier plate displaceably mounted relative to one another, a force which a user exerts on the actuating device may be transmitted to the locking element, so that the latching device may be unlocked in order to perform, in particular, a vertical adjustment of the head restraint.

According to a preferred embodiment of the invention, a second spring means is provided, said second spring means pretensioning the upper carrier plate and the lower carrier plate into a centered position. Thus, by means of a simple mechanism, it is achieved that after the actuation of the actuating device the lower and the upper carrier plate return into the original centered position which corresponds to the locked position of the locking element. The latching device is thus designed such that a user has to exert a force onto the actuating device in order to guide the locking element into the unlocked position, wherein when the actuating device is released the locking element automatically returns to the locked position. The second spring means also has the object of ensuring clearance between the upper carrier plate and the lower carrier plate in the y-direction, so that no undesirable noise is generated.

Preferably the second spring means comprises two opposingly arranged helical springs which are arranged in opposing directions relative to one another, in each case between the upper and lower carrier plate, so that one of the two helical springs is extended when the other of the two helical springs is compressed. Thus, in a particularly simple manner it is achieved that the upper carrier plate returns to the centered position after the actuation of the actuating device. Moreover, this simple mechanism permits renewed unlocking by means of subsequent renewed actuation of the actuating device.

Preferably, the actuating device is configured as a push button or toggle lever.

According to a possible exemplary embodiment of the invention, the locking element is mounted relative to the lower carrier plate such that the locking element is fixed parallel to the y-axis and is able to be moved parallel to an x-axis extending perpendicularly to the y-axis. The actuation of the actuating device transmits a force by means of the upper carrier plate onto the locking element, in order to move the locking element for unlocking away from the retaining rod and/or for locking toward the retaining rod. In this case, the locking element is moved parallel to the x-axis and perpendicular to the direction of the force originally exerted by the user which is oriented along the y-axis.

Preferably, the upper carrier plate and the locking element comprise means, by means of which the force acting on the upper carrier plate and parallel to the y-axis may be transmitted to the locking element in a direction parallel to the x-axis, in order to ensure a linear movement of the locking element for the locking and unlocking of the latching device.

According to a preferred embodiment of the invention, the means comprise an angled portion of the locking element and an angled surface of the upper carrier plate, wherein the angled portion comes into contact with the angled surface. The angled portion and the angled surface in this case extend obliquely to the x-axis and the y-axis, so that a displacement of the upper carrier plate parallel to the y-axis effects a displacement of the locking element parallel to the x-axis.

A head restraint for a vehicle seat has the latching device described above, wherein the, in particular height-adjustable, head restraint may be latched at a predeterminable distance by means of the latching device. To save production costs, the actuating device may be attached without substantial structural alterations to the left-hand side or alternatively to the right-hand side of the xz-plane. To this end, the head restraint may comprise, in particular, a carrier part which is also configured mirror-symmetrically relative to the xz-plane and has fastening recesses which are suitable for receiving and fastening the actuating device.

DRAWINGS

The invention is described in more detail with reference to the accompanying schematic figures.

DETAILED DESCRIPTION

Figure 1:
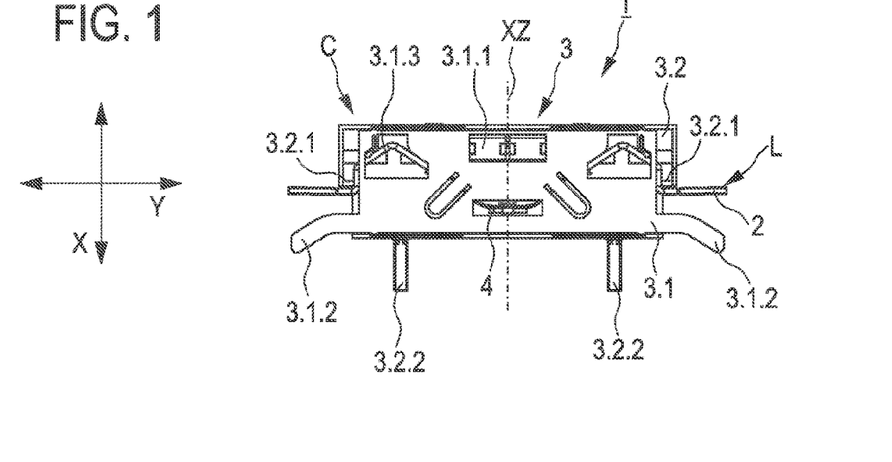
FIG. 1 shows a plan view of a latching device with a locking element in a locked position.

FIG. 1 shows a plan view of a latching device 1 comprising a locking element 2 in a locked position L. The locking element 2 is arranged between an upper carrier plate 3.1 and a lower carrier plate 3.2 of a carrier device 3, wherein the upper carrier plate 3.1 is displaceably mounted relative to the lower carrier plate 3.2 along a y-axis Y.

The bow-shaped locking element 2 is inserted into the lower carrier plate 3.2, wherein a limiting element 3.2.1 which is integrally formed on the lower carrier plate 3.2 is adjacent to the locking element 2 and prevents a movement of the locking element 2 parallel to the y-axis Y.

The bow-shaped locking element 2 is pretensioned into the locked position L by a first spring means 4 arranged between the upper and lower carrier plates.

Figure 4:
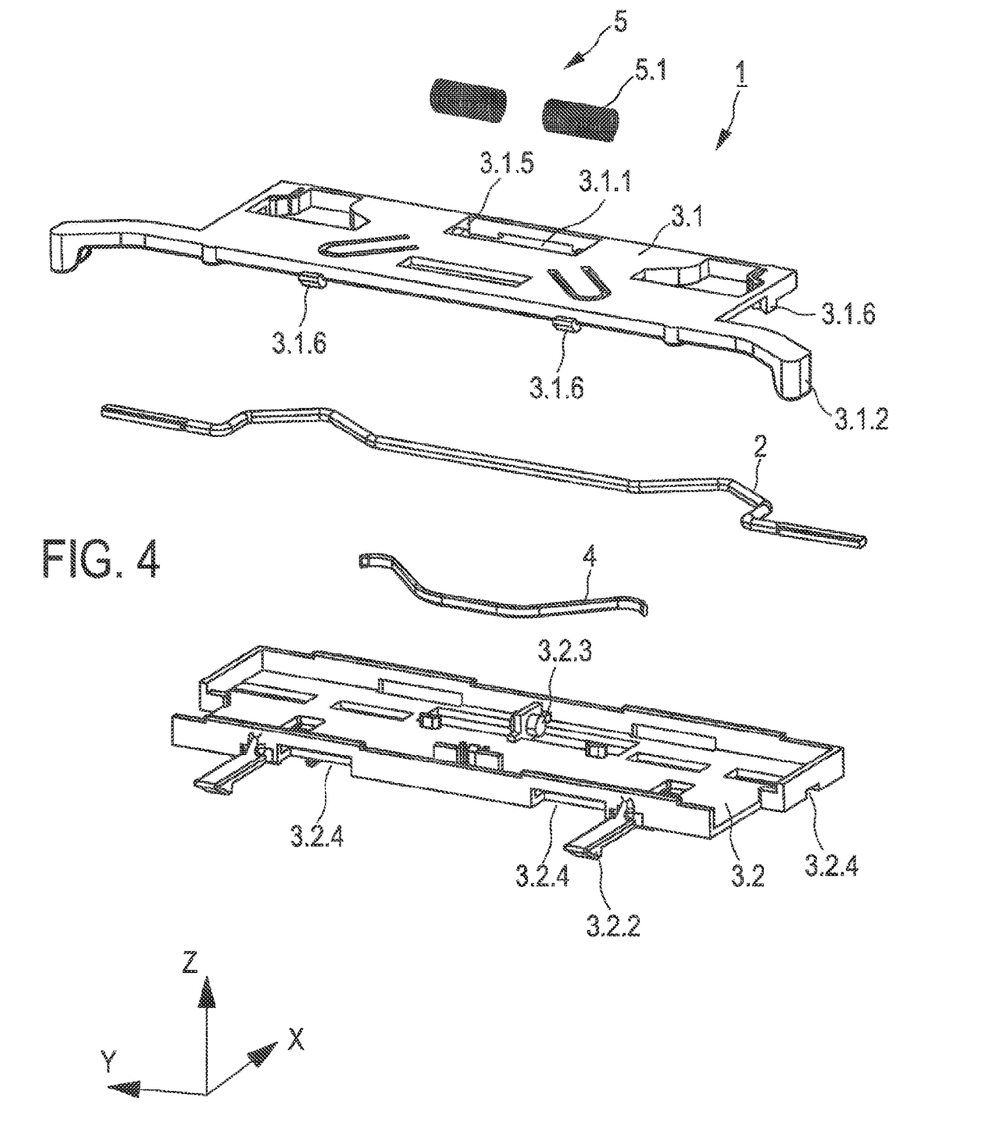
FIG. 4 shows an exploded view of a latching device.

The upper carrier plate 3.1 has a receiving recess 3.1.1 which is suitable for receiving a second spring means 5 which comprises the two opposing helical springs 5.1 mounted in opposing directions relative to one another, which are shown in detail in FIG. 4. A pretensioning of the upper carrier plate 3.1 relative to the lower carrier plate 3.2 into a centered position C is achieved by the second spring means 5.

The upper and the lower carrier plate 3.1, 3.2 with the locking element 2 located therebetween in the locked position L, as shown in FIG. 1, is configured and arranged mirror-symmetrically to an xz-plane XZ. In this case, the xz-plane XZ extends parallel to the x-axis X and a z-axis Z extending perpendicular to the plane shown in FIG. 1.

The upper carrier plate 3.1 has two opposing and laterally protruding arms 3.1.2. Moreover, two latching arms 3.2.2 protruding from the lower carrier plate 3.2 are integrally formed on a further component for fastening the latching device 1.

The bow-shaped locking element 2 is partially angled. At least one flexible arm 3.1.3 comes into contact with the partially angled locking element 2, such that clearance and/or tolerance may be compensated.

Figure 2:
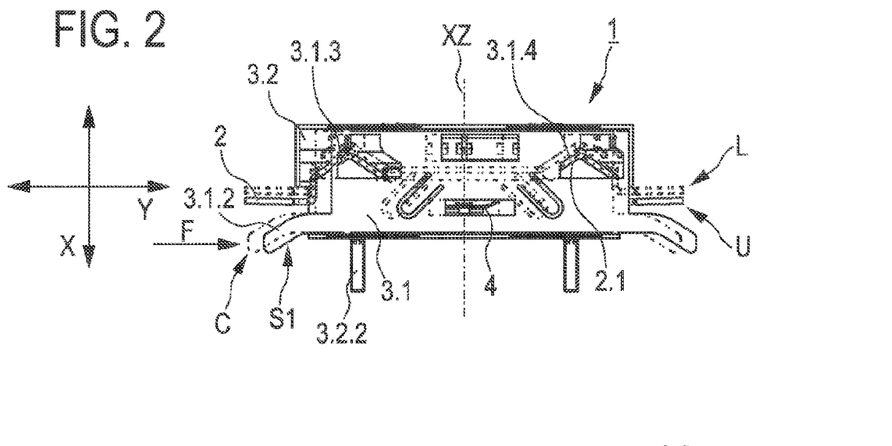
FIG. 2 shows a plan view of a latching device with a locking element in an unlocked position, wherein an upper carrier plate adopts a first laterally offset position relative to a lower carrier plate.

FIG. 2 shows a plan view of the latching device 1 comprising the locking element 2 in an unlocked position U. The upper carrier plate 3.1 adopts a first laterally offset position S1 relative to the lower carrier plate 3.2. The upper carrier plate 3.1 in the first laterally offset position S1 is offset to the right relative to the centered position C parallel to the y-axis. For a better comparison of the first laterally offset position S1 to the centered position C, a further upper carrier plate 3.1 is illustrated in dashed-dotted lines in the centered position C in FIG. 2.

The upper carrier plate 3.1 is displaceable by means of a force F acting parallel to the y-axis Y onto the laterally protruding arm 3.1.2 from the centered position C into the first laterally offset position S1. In this case, the upper carrier plate 3.1 and the locking element 2 comprise means which transmit the force F acting on the upper carrier plate 3.1 onto the locking element 2 in a direction parallel to the x-axis X.

An angled portion 2.1 of the bow-shaped locking element 2 comes into contact with the angled surface 3.1.4 so that the force F acting on the upper carrier plate 3.1 may be transmitted to the locking element 2. The displacement of the upper carrier plate 3.1 from the centered position C into the first laterally offset position S1, therefore, effects a displacement of the locking element 2 parallel to the x-axis X from the locked position L into the unlocked position U. In this case, the locking element 2 is offset in the unlocked position U relative to the locked position L parallel to the y-axis Y. For a better comparison of the unlocked position U and the locked position L, in FIG. 2 an additional locking element 2 is illustrated in dashed-dotted lines in the locked position L.

Figure 3:
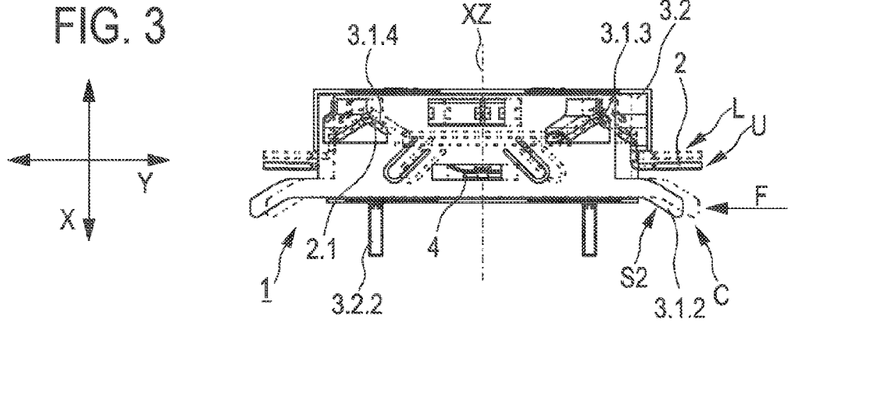
FIG. 3 shows a plan view of a latching device with a locking element in an unlocked position, wherein an upper carrier plate adopts a second laterally offset position relative to a lower carrier plate.

FIG. 3 shows a plan view of the latching device 1 comprising the locking element 2 in the unlocked position U, wherein the upper carrier plate 3.1 adopts a second laterally offset position S2 relative to the lower carrier plate 3.2. FIG. 3 corresponds substantially to the situation already shown in FIG. 2, with the difference that the force F required for guiding the locking element 2 from the locked position L into the unlocked position U is oriented to the left parallel to the y-axis. Accordingly, the upper carrier plate 3.1 is positioned, in comparison with the centered position C, to the left in the second laterally offset position S2 relative to the lower carrier plate 3.2. The centered position C of the upper carrier plate 3.1 and the locked position L of the locking element 2 are shown by means of dashed-dotted outlines in FIG. 3.

FIG. 4 shows an exploded view of the latching device 1 which comprises the upper carrier plate 3.1, the lower carrier plate 3.2, the first spring means 4, the partially angled locking element 2 and the second spring means 5, wherein the second spring means 5 comprises two opposingly arranged helical springs 5.1. Each of the two helical springs 5.1 comes into contact with a stop surface 3.1.5 of the upper carrier plate 3.1 and a central projection 3.2.3 which is integrally formed on the lower carrier plate 3.2. Thus, the two helical springs 5.1 are mounted in opposing directions and the upper carrier plate 3.1 is pretensioned into the centered position C.

According to an alternative embodiment of the invention, the second spring means 5 is produced from a rubber. In this case, the second spring means 5 comprises a resiliently deformable O-ring, which pretensions the upper carrier plate 3.1 into the centered position C.

For connecting the upper carrier plate 3.1 to the lower carrier plate 3.2, the upper carrier plate 3.1 has a plurality of retaining lugs 3.1.6, wherein the retaining lug 3.1.6 engages in one respective corresponding retaining recess 3.2.4. In this case, the retaining recesses 3.2.4 have a corresponding axial extent parallel to the y-axis Y, so that a displacement of the upper carrier plate 3.1 relative to the lower carrier plate 3.2 is possible between the centered position C, the first and the second laterally offset position S1, S2.

Figures 5, 6:
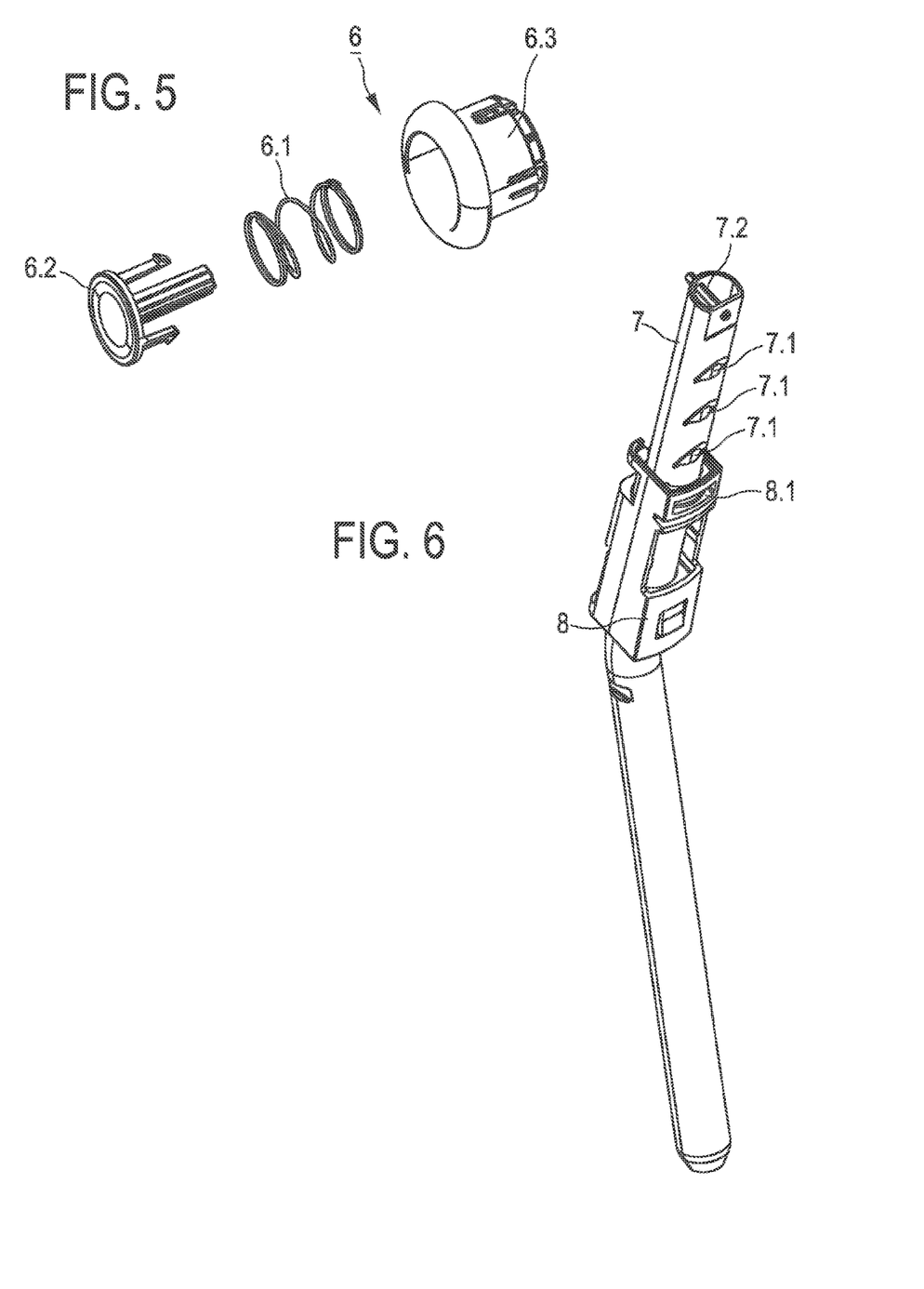
FIG. 5 shows an exploded view of an actuating device.
FIG. 6 shows a perspective view of a retaining rod with a retaining sleeve.

FIG. 5 shows an exploded view of an actuating device 6 which is configured as a push button. The actuating device 6 comprises a spring element 6.1, an actuating element 6.2 and a retaining bush 6.3. The actuating element 6.2 is able to be pushed manually into the retaining bush 6.3 counter to a spring force exerted by the spring element 6.1. The actuating device 6 is arranged such that, with the manual actuation of the actuating device 6, the force F is transmitted to one of the two laterally protruding arms 3.1.2 of the upper carrier plate 3.1.

In FIG. 6, a retaining rod 7 is shown with a plurality of recesses 7.1 spaced apart from one another. For latching the latching device 1 in a predeterminable position relative to the retaining rod 7, the locking element 2 engages non-positively and/or positively in one of the recesses 7.1.

A retaining sleeve 8 is displaceably mounted on the retaining rod 7. The retaining sleeve 8 serves for fastening the latching device 1 to the retaining rod 7 so that the latching device 1 is able to be latched in a plurality of positions which correspond to the recesses 7.1. To this end, the locking element 2 engages through a slot-shaped recess 8.1 of the retaining sleeve 8 in the recess 7.1 of the retaining rod 7. A fixing pin 7.2 attached to the end of the retaining rod 7 limits a displacement of the retaining sleeve 8 along the retaining rod 7.

Figure 7:
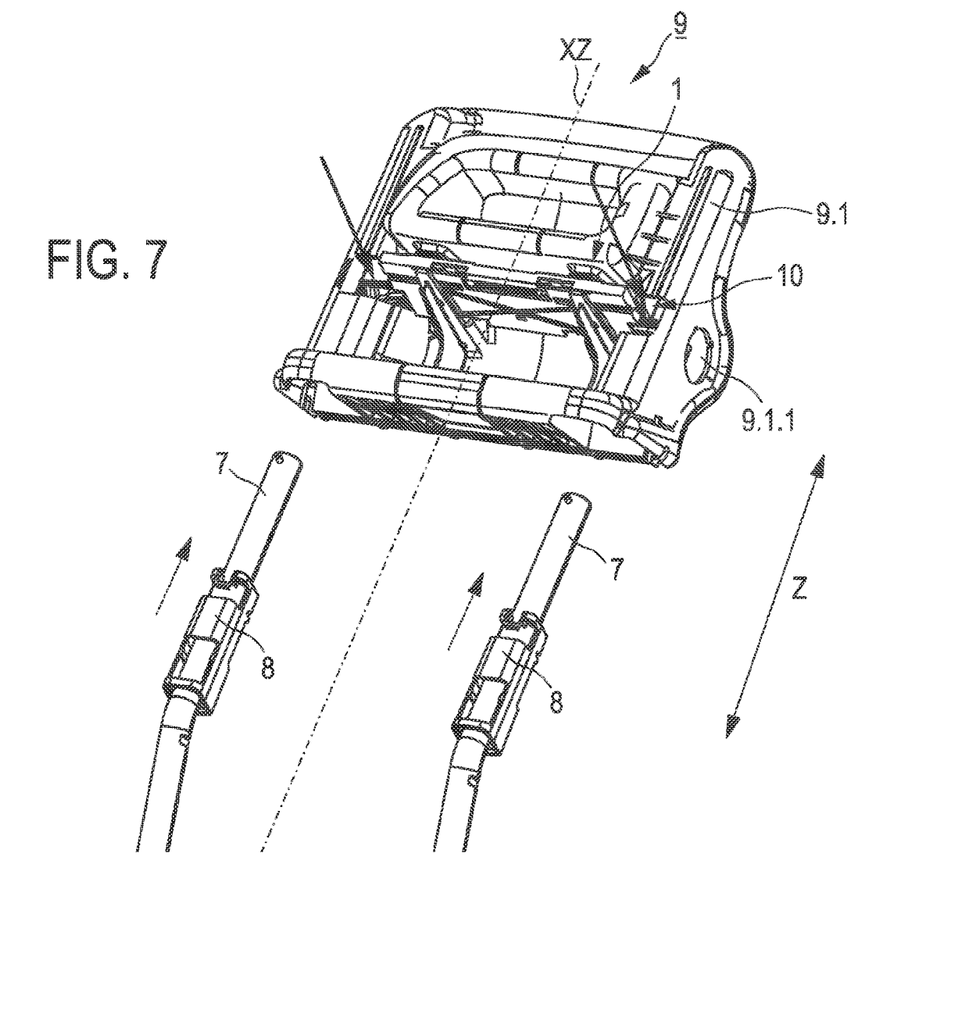
FIG. 7 shows a perspective view of a carrier part of a head restraint.

FIG. 7 shows a perspective view of a carrier part 9.1 of a head restraint 9. The carrier part 9.1 is produced from a plastics material and has fastening means 10 for receiving and fastening the latching device 1. The latching device 1 is fixed to the carrier part 9.1 by means of a latching connection between the fastening means 10 and the latching arm 3.2.2.

The carrier part 9.1 is configured mirror-symmetrically to the xz-plane XZ and has two opposing fastening recesses 9.1.1 which are suitable for receiving the retaining bush 6.3 for fastening the actuating device 6 to the carrier part 9.1. In this case, only one fastening device 6 is fastened to the head restraint 9, said fastening device engaging in one of the two fastening recesses 9.1.1 either on the right-hand side or alternatively on the left-hand side.

Two retaining rods 7 arranged parallel to one another, and which in each case comprise a retaining sleeve 8, are inserted into the carrier part 9.1. The retaining sleeve 8 is non-positively and/or positively connected to the carrier part 9.1, for example by means of a further latching connection. Thus the carrier part 9.1 of the head restraint 9 is displaceably mounted relative to the retaining rods 7 so that the head restraint 9 may be guided substantially along the z-axis Z into a desired height and may be latched there by means of the latching device 1.

Figure 8:
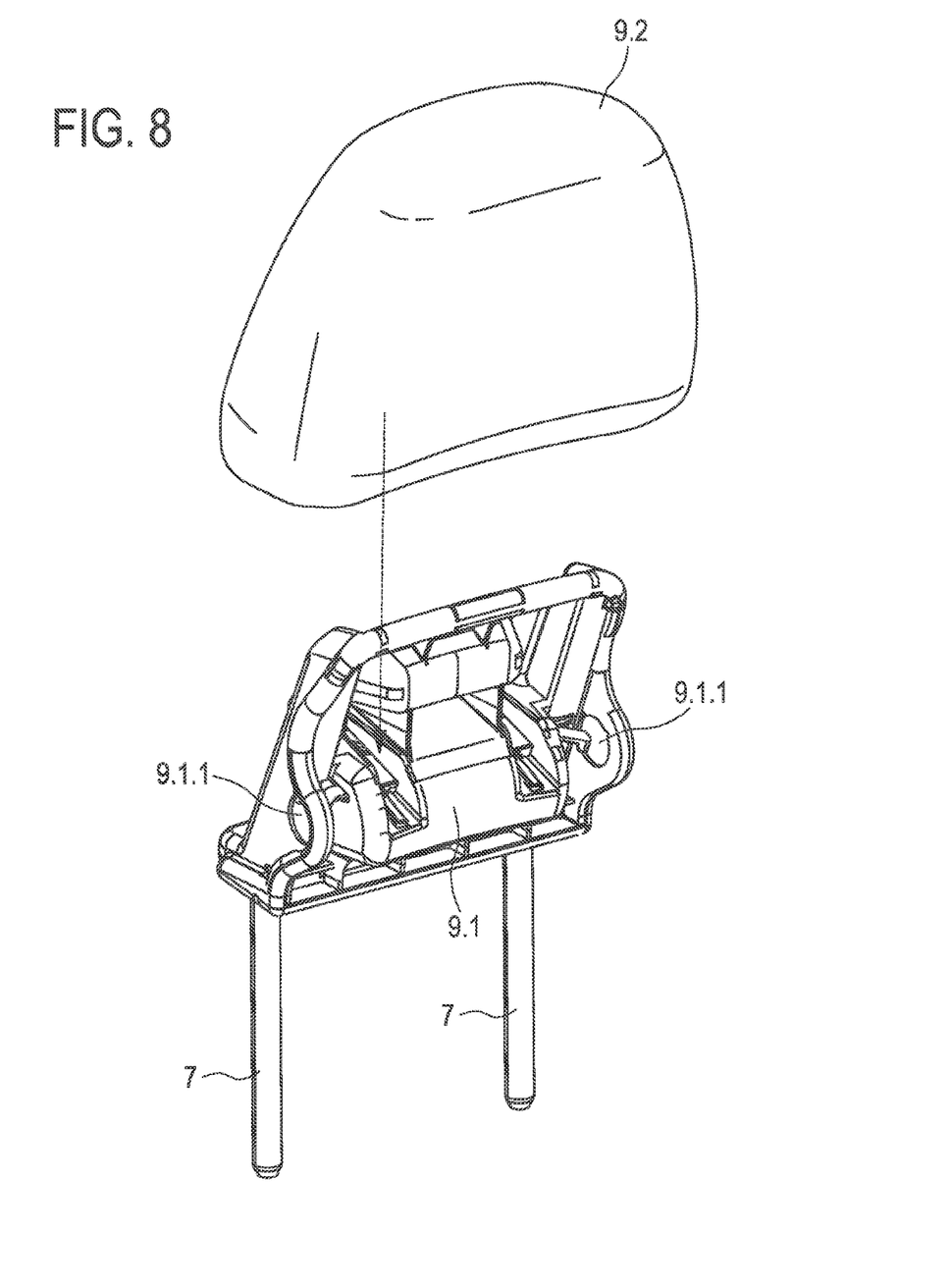
FIG. 8 shows a perspective view of an arrangement of a head restraint cushion on a carrier part of a head restraint.

FIG. 8 shows a perspective view of an arrangement of a head restraint cushion 9.2 on the carrier part 9.1 of the head restraint 9. The head restraint cushion 9.2 is produced from a plastics foam so that on one side, to which the actuating device 6 is intended to be attached, a corresponding recess, as indicated in FIG. 8 by a dashed-dotted circular outline, may be cut out of the material of the head restraint cushion 9.2.

Figure 9:
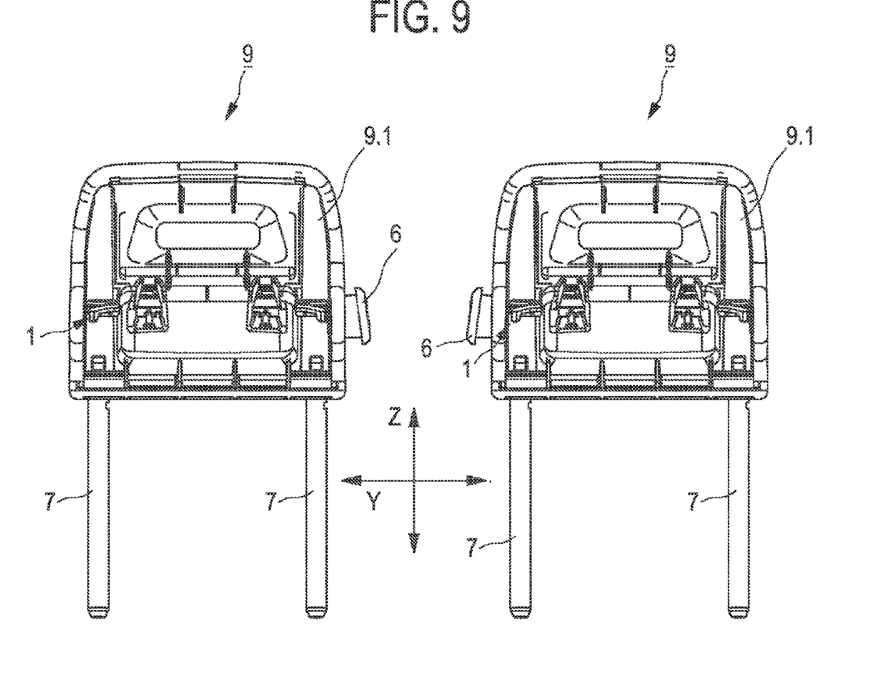
FIG. 9 shows a rear view of two un-upholstered head restraints, wherein one respective actuating device is arranged in each case on one of the two head restraints.

FIG. 9 shows a rear view of two un-upholstered head restraints 9, wherein one respective actuating device 6 is arranged in each case on one of the two head restraints 9. One of the two head restraints 9 has an actuating device 6 attached to the right-hand side, whereas the other of the two head restraints 9 has an actuating device 6 attached to the left-hand side.

Figure 10:
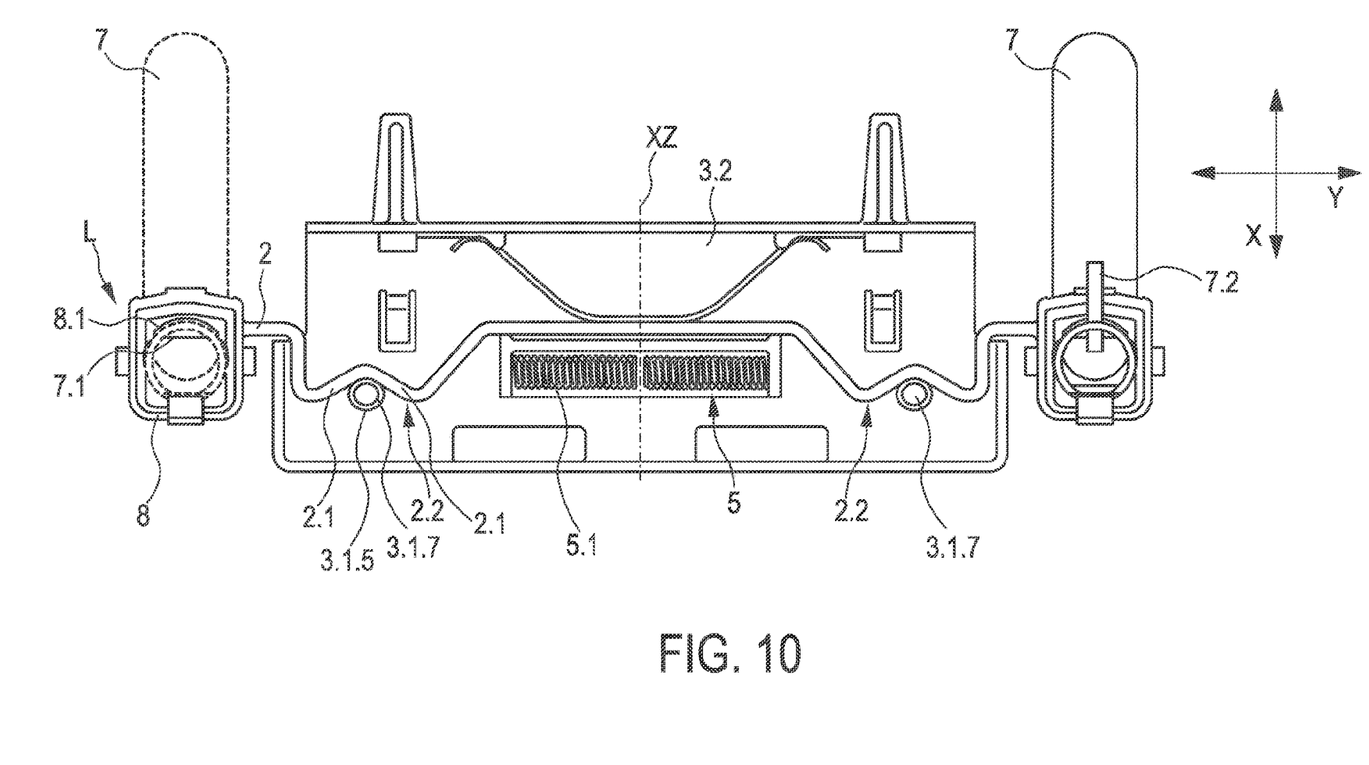
FIG. 10 shows a plan view of an alternative embodiment of a latching device with a locking element which has a substantially W-shaped angled portion.

FIG. 10 shows a plan view of an alternative exemplary embodiment of the latching device 1. The lower carrier plate 3.2, into which the bow-shaped locking element 2 is inserted, is shown. The locking element 2 has a substantially W-shaped angled portion 2.2, which comprises two angled portions 2.1 adjacent to one another. A stop pin 3.1.7 integrally formed on the upper carrier plate 3.1 forms, with a substantially circular cross section, the round stop surface 3.1.5 which comes into contact with the two adjacent angled portions 2.1 of the substantially W-shaped angled portion 2.2.

Alternatively, in all embodiments of the invention the vertical arrangement relative to the z-axis Z of the upper carrier plate 3.1 and the lower carrier plate 3.2 may be interchanged, i.e. the lower carrier plate 3.2 may be arranged, in particular, above the carrier plate 3.1.

The manual actuation of the actuating device 6 effects a relative displacement between the stop pin 3.1.7 and the lower carrier plate 3.2 parallel to the y-axis Y. In this case, the stop surface 3.1.5 comes into contact with one of the two adjacent angled portions 2.1, so that the locking element 2 is able to be moved away from the retaining rod 7 for unlocking parallel to the x-axis X.

For adjusting the height of the head restraint 9, the actuating device 6 is manually actuated by the user, wherein the actuating element 6.2 is pushed inwards. In this case, the user exerts the force F in order to guide the locking element 2 of the latching device 1 from the locked position L into the unlocked position U. As long as the force F is applied, the locking element 2 remains in the unlocked position U, which permits a vertical adjustment of the head restraint 9. To this end, the head restraint 9 is displaced substantially parallel to the z-axis Z. As soon as the user releases the actuating device, the locking element 2 is guided back into the locked position L by means of a spring force which is exerted by the first spring means 4 onto the locking element 2. In this case, the locking element 2 engages in one of the recesses 7.1 of the retaining rod 7 for latching the head restraint 9 at the predetermined height.

In the exemplary embodiment shown in FIG. 10, the two angled portions 2.1 and the stop pin 3.1.7 are dimensioned such that force F exerted by a user on the actuating device 6 is not constant when the actuating element 6.2 is pushed in. The force F initially increases substantially with the increasing displacement of the upper and lower carrier plates 3.1, 3.2 in a linear manner. If the stop surface 3.1.5 of the stop pin 3.1.7 of round configuration reaches an end of the angled portion 2.1, the stop surface 3.1.5 bears against the bent end of the angled portion 2.1 such that a spring force acting parallel to the y-axis Y, which is exerted by the first spring means 4, does not cause force to be applied to the upper carrier plate 3.2 parallel to the x-axis X. As a result, the force F applied by the user of the actuating device 6 is reduced or at least remains constant. Thus, it is achieved that the latching device 1 for the head restraint 9 may be held by the user using a reduced force F in the unlocked state in which the locking element 2 is positioned in the unlocked position U.

The invention claimed is:

1. A latching device for a head restraint comprising a locking element displaceably mounted in a carrier device, the locking element being able to be displaced from a locked position into an unlocked position by actuation of an actuating device, wherein the latching device is displaceably mounted relative to a retaining rod, and wherein in the unlocked position the locking element permits displacement of the latching device relative to the retaining rod, and in the locked position the locking element engages in at least one recess of the retaining rod for latching the latching device relative to the retaining rod, wherein in the locked position the carrier device with the locking element arranged therein is configured mirror-symmetrically to an xz-plane extending perpendicularly to a lengthwise dimension of the carrier device, wherein the carrier device comprises an upper carrier plate and a lower carrier plate, wherein the upper carrier plate and the lower carrier plate are slidably mounted to each other on the headrest for translational movement relative to one another and parallel to a y-axis, wherein the xz-plane is defined by an x-axis generally in a fore and aft direction and a z-axis generally in a vertical direction when the latching device is in a position of use, wherein the y-axis extends in a side-to-side direction perpendicular to the xz-plane.

2. The latching device of claim 1, wherein the actuating device is arranged on the left-hand side or right-hand side of the xz-plane along the y-axis extending perpendicularly to the xz-plane.

3. The latching device of claim 1, wherein a first spring pretensions the locking element into the locked position.

4. The latching device of claim 1, comprising a second spring pretensioning the upper carrier plate and the lower carrier plate into a centered position.

5. The latching device of claim 4, wherein the second spring comprises two helical springs arranged in opposing directions relative to one another.

6. The latching device of claim 1, wherein the locking element is mounted relative to the lower carrier plate such that the locking element is fixed parallel to the y-axis and is able to be moved toward the retaining rod or away from the retaining rod parallel to an x-axis extending perpendicularly to the y-axis.

7. The latching device of claim 6, wherein the upper carrier plate and the locking element are configured to transmit a force acting on the upper carrier plate parallel to the y-axis to the locking element in a direction parallel to the x-axis.

8. The latching device of claim 7, comprising an angled portion of the locking element and an angled surface of the upper carrier plate, wherein the angled portion comes into contact with the angled surface to transmit the force.

9. The latching device of claim 1, wherein the head restraint is configured to latch at a predeterminable distance by the latching device.

* * * * *